United States Patent
Sandell et al.

(10) Patent No.: US 10,404,409 B2
(45) Date of Patent: Sep. 3, 2019

(54) RECONFIGURABLE ENCODING ARRAYS FOR REDUCED OUTAGE PROBABILITY SENSOR NETWORKS

(71) Applicant: KABUSHIKI KAISHA TOSHIBA, Tokyo (JP)

(72) Inventors: Magnus Stig Torsten Sandell, Bristol (GB); Filippo Tosato, Bristol (GB); Sedat Gormus, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/503,579

(22) PCT Filed: Dec. 11, 2014

(86) PCT No.: PCT/GB2014/053678
§ 371 (c)(1),
(2) Date: Feb. 13, 2017

(87) PCT Pub. No.: WO2016/092245
PCT Pub. Date: Jun. 16, 2016

(65) Prior Publication Data
US 2018/0083734 A1     Mar. 22, 2018

(51) Int. Cl.
*G06F 11/00* (2006.01)
*H04L 1/00* (2006.01)
(Continued)

(52) U.S. Cl.
CPC ........ *H04L 1/0058* (2013.01); *G06F 11/1076* (2013.01); *H04L 1/0045* (2013.01); *H04L 1/206* (2013.01); *G06F 2211/1028* (2013.01)

(58) Field of Classification Search
CPC ...... H04L 1/0058; H04L 1/0045; H04L 1/206
See application file for complete search history.

(56) References Cited

U.S. PATENT DOCUMENTS

| 6,088,330 | A | * | 7/2000 | Bruck | ................. G06F 11/1076 370/228 |
| 7,107,498 | B1 | | 9/2006 | Schmidt et al. | |

(Continued)

FOREIGN PATENT DOCUMENTS

| JP | 2005-523619 A | 8/2005 |
| WO | WO 2014/191705 A1 | 12/2014 |

OTHER PUBLICATIONS

International Preliminary Report on Patentability and Written Opinion issued by the International Bureau of WIPO dated Jun. 22, 2017, for International Appl. No. PCT/GB2014/053678.
(Continued)

*Primary Examiner* — Esaw T Abraham
(74) *Attorney, Agent, or Firm* — Finnegan, Henderson, Farabow, Garrett & Dunner, L.L.P.

(57) ABSTRACT

In an embodiment, a method of managing distributed storage in a wireless network is disclosed. The wireless network comprises a plurality of data generating nodes, each data generating node configured to generate and store data symbols and parity symbols. The parity symbols depend on data symbols stored on other data generating nodes. The method comprises receiving indications of link quality estimates for wireless links between the data generating nodes; selecting an arrangement of an array code from a plurality of possible arrangements using the indications of link quality estimates, the array code depending on the number of data generating nodes in the plurality of data generating nodes and a required number of nodes from which all of the data symbols stored in the wireless network can be generated, the arrangement indicating for each data generating node, the dependence of the parity symbols stored on that data generating node on the data symbols stored on other data generating nodes; and
(Continued)

sending an indication of the selected arrangement to the data generating nodes.

19 Claims, 9 Drawing Sheets

(51) Int. Cl.
*G06F 11/10* (2006.01)
*H04L 1/20* (2006.01)

(56) References Cited

U.S. PATENT DOCUMENTS

| | | | |
|---|---|---|---|
| 7,260,763 B2 * | 8/2007 | Sukhobok | H03M 13/118 714/758 |
| 7,458,009 B2 * | 11/2008 | Yu | H03M 13/1114 714/800 |
| 7,844,879 B2 * | 11/2010 | Ramamoorthy | G06F 11/1068 365/185.09 |
| 7,899,766 B2 * | 3/2011 | Bax | G06N 99/005 706/20 |
| 8,296,623 B2 * | 10/2012 | Cassuto | G06F 11/1068 714/759 |
| 8,473,812 B2 * | 6/2013 | Ramamoorthy | G06F 11/1068 365/185.09 |
| 8,677,065 B1 | 3/2014 | Cousins | |
| 9,067,785 B2 * | 6/2015 | Eng | C01B 3/384 |
| 9,356,574 B2 * | 5/2016 | Denninghoff | H03H 9/02622 |
| 9,367,785 B2 * | 6/2016 | Sabesan | G01S 7/42 |
| 9,397,738 B2 * | 7/2016 | Xu | H04B 7/0417 |
| 2012/0079318 A1 | 3/2012 | Colgrove et al. | |
| 2016/0294419 A1 | 10/2016 | Sandell et al. | |

OTHER PUBLICATIONS

Anastasi et al., "How to Prolong the Lifetime of Wireless Sensor Networks," Mobile Ad Hoc and Pervasive Communications (2006), pp. 1-26.

Fasolo et al., "In-Network Aggregation Techniques for Wireless Sensor Networks: A Survey," IEEE Wireless Communications (Apr. 2007), pp. 70-87.

Xu et al., "Low-Density MDS Codes and Factors of Complete Graphs," IEEE Transactions on Information Theory (Sep. 1999), 45:1817-26.

Sandell et al., "Lowest Density MDS Array Codes for Reliable Smart Meter Networks," arXiv:13103695v2 (Nov. 6, 2013), pp. 1-30.

* cited by examiner

RECONFIGURABLE ENCODING ARRAYS FOR REDUCED OUTAGE PROBABILITY SENSOR NETWORKS

FIELD

Embodiments described herein relate to the configuration of array codes for use in wireless networks having a plurality of data generating nodes such as a wireless sensor network.

BACKGROUND

Wireless Sensor Networks (WSNs) have applications in areas such as e-Health, Smart Community and Smart Grid. WSNs consist of sensors operating autonomously and reporting application specific parameters to a central server. These parameters can be vital signs of a patient for a health-care scenario or air quality monitoring for a "Smart City" application. Many of these applications require the sensors to be battery powered and operate over long period of time reliably. One way to reduce the energy consumption in the network is to duty-cycle the radio interface in order to extend network lifetime. On the other hand, in some cases, it may be possible to take advantage of in-network aggregation and storage where the sensor devices store the generated data locally to reduce network traffic and extend network lifetime. In this case, the data is forwarded to the sink node on an event based approach where either a trigger event or a query from the sink is used to ferry the sensor data to the sink node. In this case, it is important to store and retrieve the generated sensor data reliably which can be achieved using a distributed storage approach where data belonging to a node is stored across a number of nodes and retrieved by connecting a subset of these nodes in the event of a node or link failure.

Array codes can be used in networks to introduce redundancy and protect against node or link failures. This is achieved by having nodes exchange data symbols and storing parity symbols based on the data from other nodes. However the parity symbols can only be computed if these data symbols are successfully exchanged.

BRIEF DESCRIPTION OF THE DRAWINGS

In the following, embodiments are described, by way of example only, with reference to the accompanying drawings in which:

FIG. 6a shows an example the graph of an array code with n=4 nodes capable of correcting r=2 failures;

FIG. 6b shows an undirected graph of the node connectivity shown in FIG. 6a;

FIG. 10a shows an example of an array code with n=6 nodes capable of correcting r=3 erasures;

FIG. 10b shows the connectivity graph for the array code shown in FIG. 10a;

DETAILED DESCRIPTION

Figure 1:
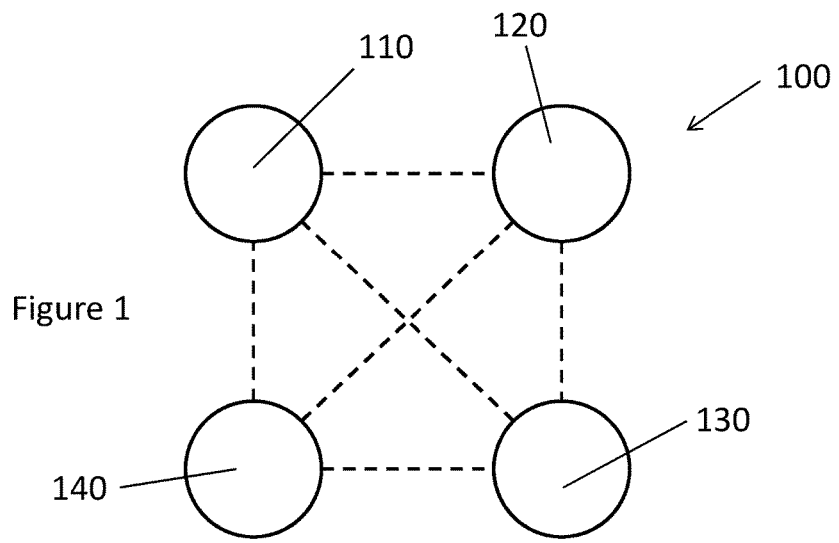
FIG. 1 shows a wireless network according to an embodiment.

In an embodiment, a method of managing distributed storage in a wireless network is disclosed. The wireless network comprises a plurality of data generating nodes, each data generating node configured to generate and store data symbols and parity symbols. The parity symbols depend on data symbols stored on other data generating nodes. The method comprises receiving indications of link quality estimates for wireless links between the data generating nodes; selecting an arrangement of an array code from a plurality of possible arrangements using the indications of link quality estimates, the array code depending on the number of data generating nodes in the plurality of data generating nodes and a required number of nodes from which all of the data symbols stored in the wireless network can be generated, the arrangement indicating for each data generating node, the dependence of the parity symbols stored on that data generating node on the data symbols stored on other data generating nodes; and sending an indication of the selected arrangement to the data generating nodes.

In an embodiment, sending an indication of the selected arrangement to the data generating nodes comprises sending to each data generating node an indication of the dependence of the parity symbols stored on that data generating node on the data symbols stored on other data generating nodes.

In an embodiment, sending an indication of the selected arrangement to the data generating nodes comprises sending to each data generating node an indication of data generating nodes of the wireless network to which to send the data symbols stored on that node.

In an embodiment, the indications of link quality estimates are internode error probabilities.

In an embodiment, the method further comprises identifying a pair of nodes having the highest internode error probability and selecting an arrangement in which no data symbols are exchanged between the identified pair of nodes.

In an embodiment, the method further comprises iteratively grouping nodes having the highest internode probability together to form a set of subgraphs and determining the arrangement for the array code from a complement graph of the set of subgraphs.

In an embodiment, the method further comprises determining an outage probability for each of the plurality of possible arrangements and selecting the possible arrangement having the lowest outage probability.

In an embodiment, the arrangement of the array code from is selected from a plurality of stored possible arrangements.

In an embodiment, selecting an arrangement of the array code from a plurality of possible arrangements using the indications of link quality estimates comprises determining an array code from the number of data generating nodes in the network and an indication of the required redundancy of the array code, and determining the plurality of possible arrangements from the array code.

In an embodiment a controller for a wireless network is disclosed. The wireless network comprises a plurality of data generating nodes. Each data generating node is configured to generate and store data symbols and parity symbols. The parity symbols depend on data symbols stored on other data generating nodes. The controller comprises a wireless interface configured to receive indications of link quality estimates for wireless links between the data generating nodes; a processor configured to select an arrangement for an array code from a plurality of possible arrangements using the indications of link quality estimates, the array code depending on the number of data generating nodes in the plurality of data generating nodes and a required number of nodes from which all of the data symbols stored in the wireless network can be generated, the arrangement indicating for each data generating node, the dependence of the parity symbols stored on that data generating node on the data symbols stored on other data generating nodes, the wireless interface is further configured to send an indication of the selected arrangement to the data generating nodes.

In an embodiment the controller further comprises storage for the plurality of possible arrangements.

In an embodiment, the storage is configured to store a plurality of array codes and the processor is further configured to select an array code from the plurality of array codes.

In an embodiment, the wireless interface is further configured to send each data generating node an indication of the dependence according to the configured array code of the parity symbols stored on that data generating node on the data symbols stored on other data generating nodes.

In an embodiment, the wireless interface is further configured to send to each data generating node an indication of data generating nodes of the wireless network to which to send the data stored on that node.

In an embodiment, the indications of link quality estimates are internode error probabilities.

In an embodiment, the processor is further configured to identify a pair of nodes having the highest internode error probability and select an arrangement in which there is no dependence of parity symbols on data symbols between the identified pair of nodes.

In an embodiment, the processor is further configured to iteratively group nodes having the highest internode probability together to form a set of subgraphs and to determine the arrangement for the array code from a complement graph of the set of subgraphs.

In an embodiment, the processor is further configured to determine an outage probability for each of the plurality of possible arrangements and selecting the possible arrangement having the lowest outage probability.

The described embodiments can be incorporated into a specific hardware device, a general purpose device configured by suitable software, or a combination of both. Aspects can be embodied in a software product, either as a complete software implementation, or as an add-on component for modification or enhancement of existing software (such as a plug in). Such a software product could be embodied in a carrier medium, such as a storage medium (e.g. an optical disk or a mass storage memory such as a FLASH memory) or a signal medium (such as a download). Specific hardware devices suitable for the embodiment could include an application specific device such as an ASIC, an FPGA or a DSP, or other dedicated functional hardware means. The reader will understand that none of the foregoing discussion of embodiment in software or hardware limits future implementation of the invention on yet to be discovered or defined means of execution.

FIG. 1 shows a wireless network 100 according to an embodiment. The wireless network comprises a plurality of data generating nodes. In the embodiment shown in FIG. 1 the network 100 comprises a first data generating node 110, a second data generating node 120, a third data generating node 130 and a fourth data generating node 140.

Each of the data generating nodes comprises a sensor configured to measure a parameter local to the node. For example, the data generating nodes may be sensors which measure vital signs of a patient in a body area network, the data generating nodes may be smart meters which measure energy usage, or the data generating nodes may measure an environmental variable such as air quality.

The data generating nodes are configured to wirelessly communicate with each other over the wireless network 100. This allows the data measured on the individual nodes to be retrieved.

In many cases, it is desirable to obtain the data from all nodes by communicating with only a subset of them. This is possible if redundancy is introduced in the network, i.e., the data from one node is stored at one or more other nodes. With an adequate scheme, it could be possible to retrieve the data from all n nodes from only k of them. Another advantage could be that the concentrator node only needs to contact k nodes, even if communication with all nodes is possible.

This can be achieved by employing erasure coding, which makes it possible to reconstruct all the data even if some observations are not available. This can be achieved with an array code, where each column represents a node in the network and consists of its own data and parity symbols for data from other nodes. If there are n nodes, the data should be possible to reconstruct from knowing only k of the columns.

If the erasure code can correct the maximum number of erased symbols given the redundancy, the code is said to be MDS (maximal-distance separable). It is also important that the parity symbols are a function of as few data symbols as possible, since this minimises the number of data packets needed to be exchanged between the nodes. Erasure codes with this property are called low density.

The way the erasure code would work in the context of the sensor network is that each node in the network would generate its own data. It would then share it with the other nodes in order to have copies of it in case the node would fail. Note that all data from one node could simply be copied in full to r other nodes; since the data now exist in r+1 nodes, it can cope with r of them failing as at least one copy would survive. However this is an inefficient way of being resilient to node failures; better codes can be designed that can achieve the same level of erasure correction but with much less redundancy and storage. When the concentrator node needs the data from the network, it suffices to connect to k of the n nodes; due to the erasure code the data from the n−k failed nodes can be reconstructed. This is done by using the known dependencies of the data on the parity symbols in the k surviving nodes.

In order to form the parity symbols the data generating nodes need to exchange data. If this internode communication fails, parity symbols cannot be computed and the resilience against node failures is reduced. If at least one internode link goes down, this is called an outage.

However if the internode error probabilities are known, e.g., by using long-term measurements, they can be used to configure the array code. Since a given array code can be configured in many equivalent ways by renaming the nodes, the internode error probabilities can be exploited to reduce the outage probability.

Figure 2:
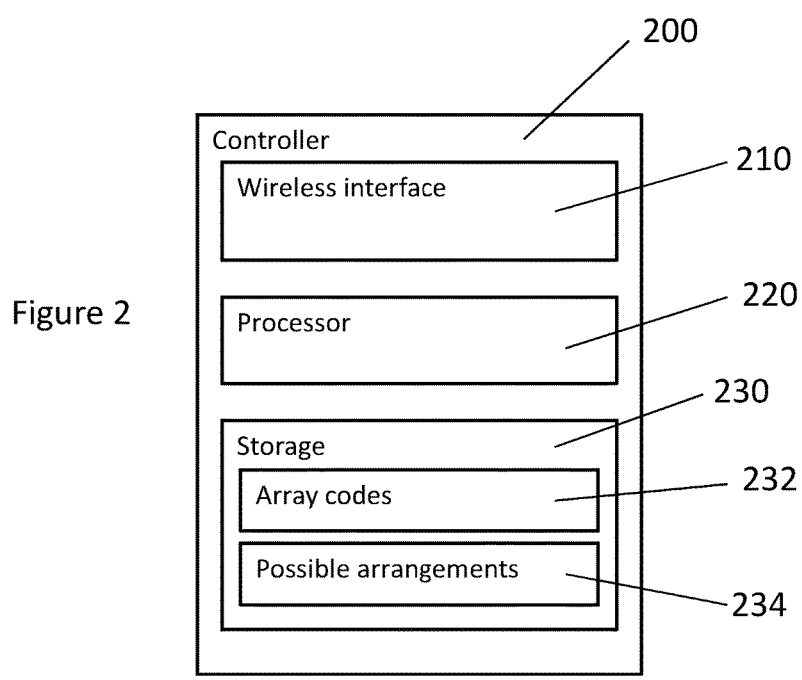
FIG. 2 shows a controller for a wireless network according to an embodiment.

FIG. 2 shows a controller 200 according to an embodiment. The controller determines a configuration of the array code to be used by the nodes of the network. The controller 200 may be implemented as a data generating node of the wireless network. It may be a concentrator node as described above.

The controller 200 comprises a wireless interface 210, a processor 220 and storage 230. The wireless interface 210 allows the controller 200 to receive information from the data generating nodes of the wireless network and to receive information from the data generating nodes of the wireless network. The wireless interface receives indications of the link quality for the links between the data generating nodes. These indications may be internode error probabilities. The wireless interface 210 is also operable to send indications of an array code and a configuration to the data generating nodes. These indications may comprise indications of how the parity symbols stored on each node are to be calculated and to which nodes of the network each data generating node should send indications of parts of the data stored on that node so that the parity symbols can be calculated.

The indications allow each node to know where to send which data symbols and how to compute the parity symbols to be stored on that node. Once the array code has been configured, this information is signalled to all nodes.

In an embodiment an index indicating which configuration is to be used is distributed to all nodes rather than the actual configuration.

The processor 220 is operable to use the received indications of link quality to select an arrangement for an array code to be used by the data generating nodes. The process of selecting an arrangement according to embodiments is discussed in more detail below.

The storage 230 stores array codes 232 and possible arrangements 234 for the array codes. As is described in more detail below, the array codes show how the parity symbols are calculated from data symbols stored on the data generating nodes. For each array code there is a plurality of possible arrangements. The processor 220 is configured to select one of the possible arrangements to reduce or minimise the outage probability.

Figure 2A:
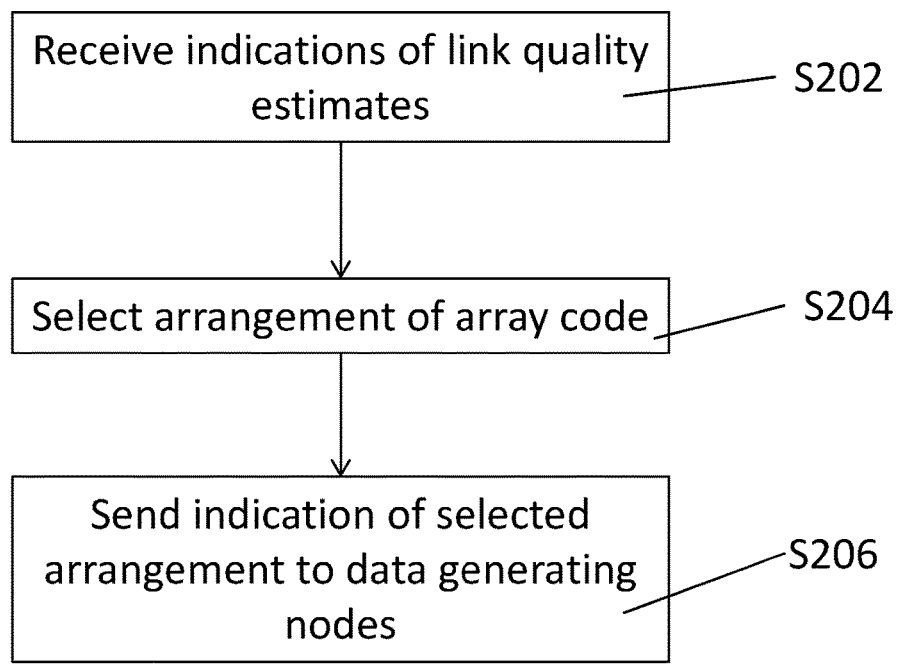
FIG. 2a shows a method of managing distributed storage in a wireless network according to an embodiment.

FIG. 2a shows a method of managing distributed in a wireless network according to an embodiment. The method may be carried out by the controller 200 shown in FIG. 2.

In step S202, the controller receives indications of link quality estimates from the nodes of the wireless network. These indications may be internode error probabilities.

In step S204, the controller selects an arrangement of an array code from a plurality of possible arrangements using the received indications of link quality.

In step S206, the controller sends an indication of the selected arrangement to the data generating nodes. Following step S206, the data generating nodes exchange data symbols as specified by the array code in the selected arrangement and generate parity symbols.

To protect the network against node failures, each node can exchange information to introduce redundancy. For example, the array code in for n=4 nodes capable of correcting r=2 erasures forms the parity symbols (all arithmetic in GF(2)):

$$f_{0,0}=d_{0,1}+d_{0,3}$$

$$f_{0,1}=d_{0,0}+d_{0,2}$$

$$f_{0,2}=d_{0,0}+d_{0,3}$$

$$f_{0,3}=d_{0,1}+d_{0,2}$$

into the array

Figure 3:
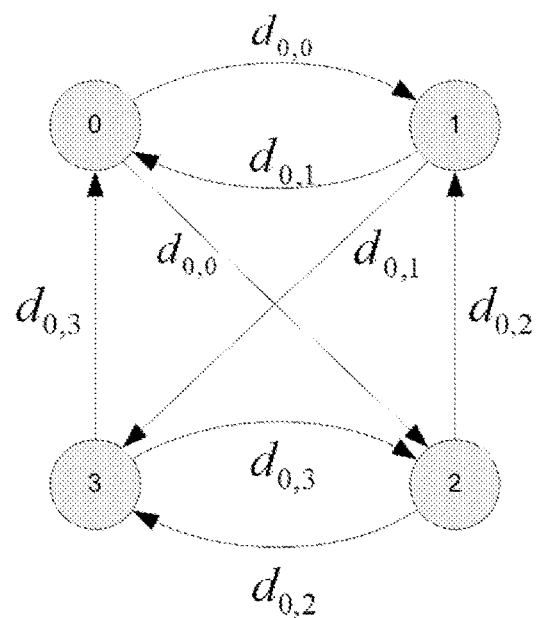
FIG. 3 shows a directed graph representation of an array code.

| | Node | | | |
|---|---|---|---|---|
| | 0 | 1 | 2 | 3 |
| Data | $d_{0,0}$ | $d_{0,1}$ | $d_{0,2}$ | $d_{0,3}$ |
| Parity | $f_{0,0}$ | $f_{0,1}$ | $f_{0,2}$ | $f_{0,3}$ | where $d_{i,j}$ and $f_{i,j}$ denote the ith data and parity symbol at node j, respectively. FIG. 3 shows a directed graph representation of the array code described above for n=4 nodes capable of correcting r=2 erasures. The data generating nodes are labelled 0, 1, 2 and 3. Each edge represents a data symbol that needs to be exchanged with another node in order to form a parity symbol. As shown in FIG. 3, node 0 sends data $d_{0,0}$ to nodes 1 and 2, and receives data $d_{0,1}$ from node 1 and data $d_{0,3}$ from node 3. As shown in the equations above, node 0 uses data $d_{0,1}$ and data $d_{0,3}$ to calculate the parity symbol $f_{0,0}$ stored on node 0.

If at least one internode communication fails, some parity symbols cannot be formed; we call this an outage. If the probability that communication between node i and node j fails is $p_{i,j}$, the outage probability is $$p_{out} = 1 - \prod_{i,j=0}^{n-1}(1-p_{i,j})$$

A first order approximation is $$p_{out} \approx \sum_{i,j=0}^{n-1} p_{i,j}$$

However from FIG. 3 it can be seen that not all exchanges are needed, e.g., node 1 does not send anything to node 2. If E denotes the set of edges in the directed connectivity graph, the outage probability can be written as $$p_{out} = 1 - \prod_{(i,j) \in E}(1-p_{i,j}) \approx \sum_{(i,j) \in R} p_{i,j}$$

Figure 4:
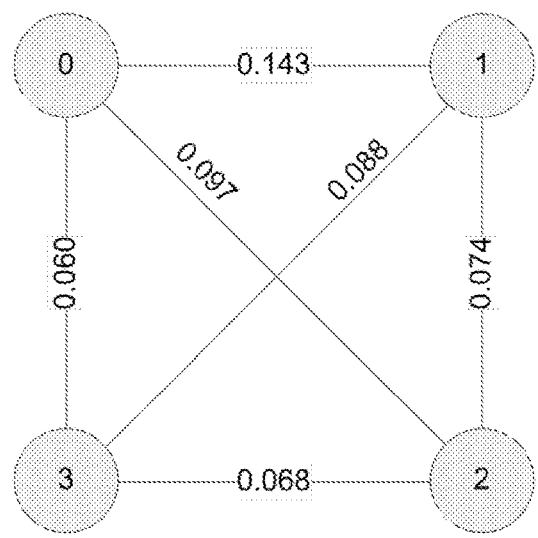
FIG. 4 shows internode error probabilities in an embodiment.
Figure 5:
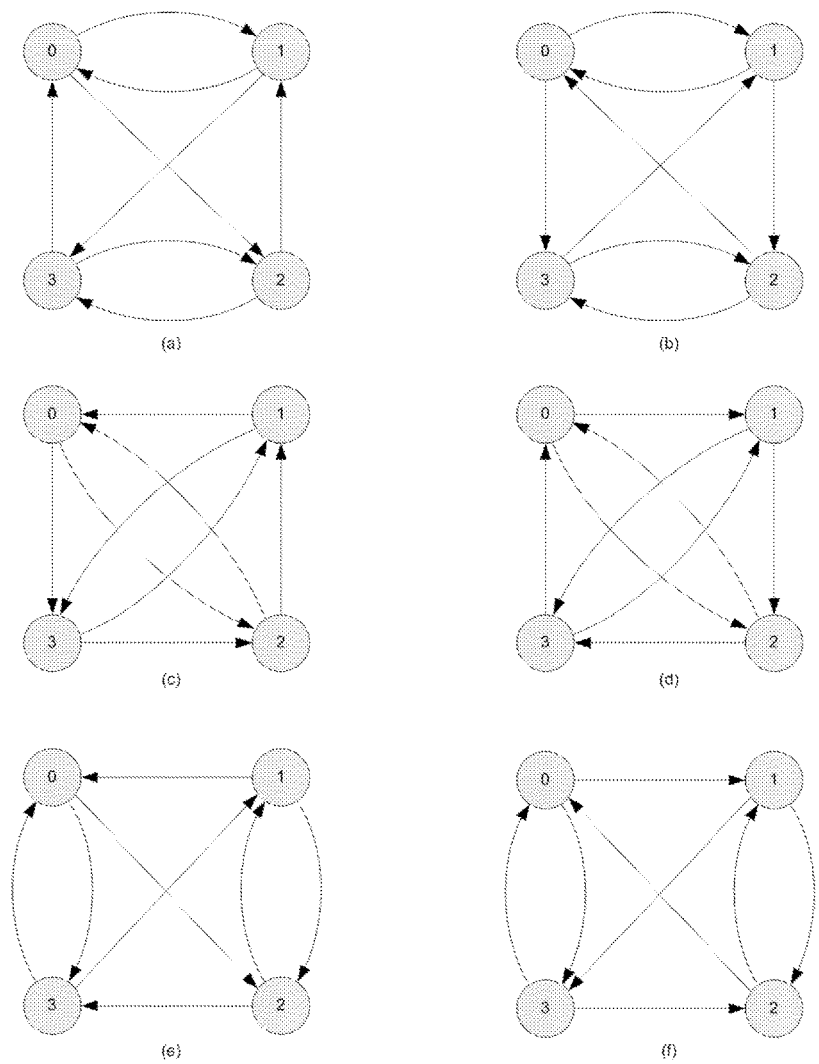
FIGS. 5a to 5f show the equivalence classes for the graph shown in FIG. 3.

FIG. 4 shows the internode error probabilities in an embodiment. As shown in FIG. 4, the internode error probability between node 0 and node 1 is 0.143, the internode error probability between node 0 and node 2 is 0.097, the internode error probability between node 0 and node 3 is 0.060. The internode error probability between node 1 and node 2 is 0.074, and the internode error probability between node 1 and node 3 is 0.088. the internode error probability between node 2 and node 3 is 0.068. Note that for simplicity it is assumed that the error probabilities are symmetric ($p_{i,j}=p_{j,i}$) but all methods in this described herein work even if they are not. If the internode error probabilities are as in FIG. 4, the outage probability is 0.5427.

Two graphs $G_1$ and $G_2$ are said to be isomorphic if there exists a bijective mapping $\phi$ such that $(\phi(u), \phi(v))$ is an edge in $G_1$ if and only if $(u, v)$ is an edge in $G_2$. This can be thought of as "renaming" the nodes, which changes the graph but it is essentially the same one since the connectivity is equivalent in the new graph. The set of all graphs that are isomorphic can be divided into a number of equivalence classes.

FIGS. 5a to 5f show the equivalence classes for the graph shown in FIG. 3. It is clear that the array code above can be represented by all these graphs: for instance, the difference between (a) and (b) is that nodes 0 and 3 have been swapped, and so have nodes 1 and 2. Although the array code stays the same, the outage probability will be different for each of the six configurations since the edge set E is different.

Using the same internode error probabilities, the outage probabilities are 0.5427, 0.5427, 0.5285, 0.5285, 0.5016, 0.5016 for the equivalence classes shown in Figures (a) to (f) respectively. Hence either configuration (e) or (f) can be used to achieve the same erasure correcting capability with lower outage probability. By using this observation, in embodiments, the outage probability can be reduced or minimised by choosing an equivalent connectivity graph, that is by renaming the nodes.

This means that if the internode error probabilities $p_{i,j}$ are known, e.g., via long-term measurements, the array code can be configured in an optimal way.

In one embodiment, the outage probability is computed according to the equation above for all equivalence classes of the connectivity graph of the array code and the best one is chosen. The equivalence classes can be pre-computed since they only depend on the array code generator matrix.

Once the best configuration has been established, it can be communicated to the nodes by, e.g., the collector node or a network node acting as the master node. This means that the array code can be dynamically configured whenever the internode error probabilities changes. For example, if a vehicle is temporarily parked between two nodes, that internode error probability might be very large for a period of time. When this is detected by the network, the array code can be reconfigured to minimise the outage probability.

Erasure codes can be generated for every number of nodes, n, and number of failures, r. An example of an erasure code is when n is divisible by r.

Figure 6:
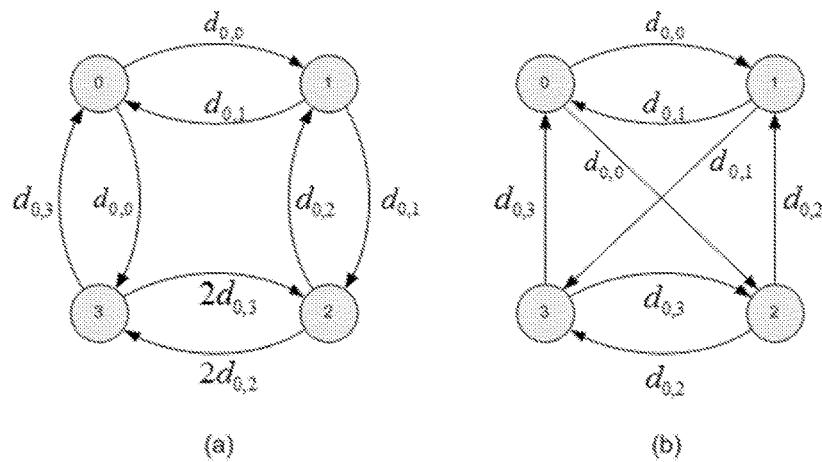

FIG. 6a shows an example the graph of an array code with n=4 nodes capable of correcting r=2 failures. Each node stores m=1 data symbol and p=1 parity symbol. If the data symbols are denoted by $d_{0,i}$, i=0, . . . , 3, the parity symbols are formed as $f_{0,0}=d_{0,1}+d_{0,3}$ $f_{0,1}=d_{0,0}+d_{0,2}$ $f_{0,2}=d_{0,1}+2d_{0,3}$ $f_{0,3}=d_{0,1}+2d_{0,2}$ where all arithmetic is done in GF(3).

This can be represented by the graph shown in FIG. 6a, which shows which nodes need to connect to which nodes. Note that for this type of array code, if node i sends at least one of its data symbols to node j, this implies that node j sends at least one data symbol to node i. Therefore, the connectivity can be represented by an undirected graph.

FIG. 6b shows an undirected graph of the node connectivity shown in FIG. 6a. The graph in FIG. 6b is a 2-regular graph with 4 nodes (in general, this type of array codes are (n−r)—regular graphs with n nodes).

Figures 7A, 7B, 7C:
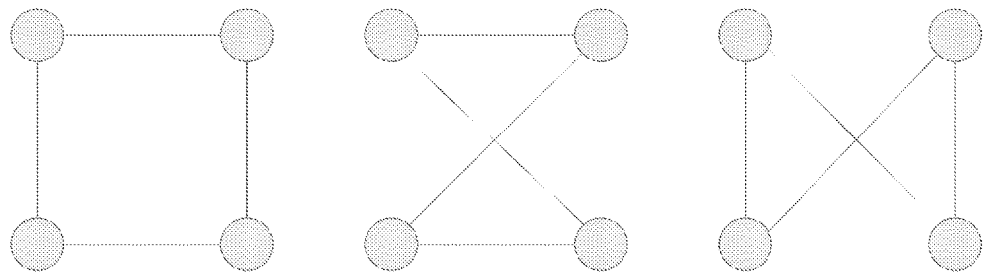
FIGS. 7a to c show equivalence classes of the graph shown in FIG. 6b.

FIGS. 7a to c show the equivalence classes of the graph shown in FIG. 6b. It can be seen that graphs are isomorphic, the nodes have only been rearranged. Due to its structure, it is possible to design a suboptimal algorithm to configure the array code.

For large number of nodes and/or node failures, the number of equivalence classes can be very large and it might be impractical and/or too complicated to evaluate them all for the array code.

In embodiments, a suboptimal algorithm with substantially lower complexity than the exhaustive search discussed above is used. The algorithm uses a greedy approach.

If r divides n, an example of an array code has the connectivity (adjacency) matrix $$A_{i,j} = \begin{cases} 1 & \mod\left(i-j, \frac{n}{r}\right) \neq 0 \\ 0 & \mod\left(i-j, \frac{n}{r}\right) = 0 \end{cases}$$

It can be shown that this connectivity graph is a regular complete multipartite graph. This means that the n nodes can be arranged into n/r sets with r nodes each; each node is connected to all nodes in the other sets but not to any nodes in its own set. For the example in FIG. 6b nodes {0,2} form a set and so do {1,3}; there are no intra-node connections but each node is connected to all nodes outside its own set.

The complement of a graph G is a graph $\tilde{G}$ on the same nodes such that two nodes in $\tilde{G}$ are connected if and only if there are not connected in G. The complement of a regular complete multipartite graph is the union of disjoint complete subgraphs.

Figure 8:
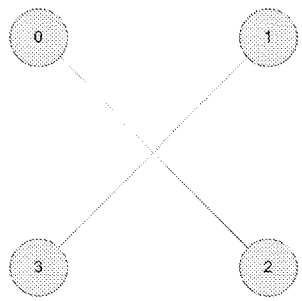
FIG. 8 shows the complement graph of the graph shown in FIG. 6b.

FIG. 8 shows the complement graph of the graph shown in FIG. 6b. Each of the $$\frac{n}{r} = 2$$

subgraphs have r=2 noes; nodes {0,2} form a complete subgraph as do nodes {1,3} and these subgraphs are disjoint.

In an embodiment, Instead of minimising the sum of error probabilities over the edge set E, the sum is maximised over the complement edge set $\tilde{E}$ since $$\sum_{(i,j)\in E} p_{i,j} = \sum_{i,j} p_{i,j} - \sum_{(i,j)\in \tilde{E}} p_{i,j}$$

Based on this a greedy algorithm can be devised that arranges the nodes in the array code according to the best available error probability.

Figure 9:
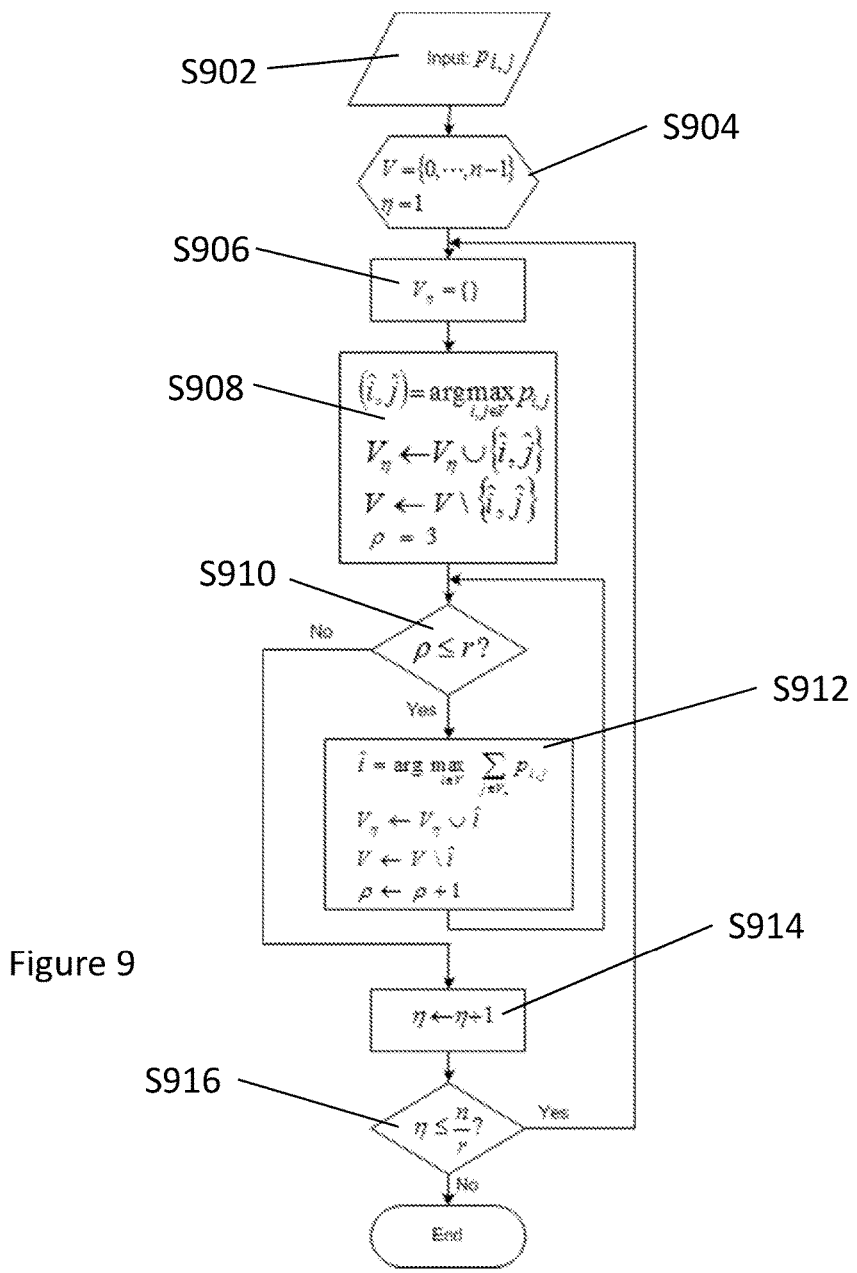
FIG. 9 is a flow chart showing a method of configuring an array code according to an embodiment.

FIG. 9 is a flow chart showing a method of configuring an array code based on the greedy algorithm as described above.

The inputs to the algorithm as shown in step S902 are the internode error probabilities $p_{i,j}$. In step S904, the algorithm initialises by forming the set of all nodes V={0, . . . , n−1} and subgraph counter η is set to 1. As the algorithm operates, nodes are moved from the set V into sets corresponding to the subgraphs of $\tilde{G}$. In step S906, the set of nodes for the $\eta^{th}$ subgraph of $\tilde{G}$ is formed.

In step S908, the pair of nodes having the largest internode error probability in the set V are identified. This pair of nodes are moved into the subgraph the set $V_\eta$ and removed from the set V. A counter ρ for the node number under consideration in the subgraph $V_\eta$ is set to 3. The counter is set to 3 as two nodes have already been added to the subgraph $V_\eta$ in step S908.

In step S910, the counter ρ for the node number is compared with the number of failures r. As noted above, each set will have r nodes. If the counter is less than r, the method moves to step S912. If the counter is more than r, the method moves to step S914.

In step S912, the node remaining in V having the highest total internode error probability with the other remaining nodes in V is identified. This best remaining node is then moved into the moved into the subgraph the set $V_\eta$ and removed from the set V. The counter ρ for the node number under consideration in the subgraph $V_\eta$ is then incremented.

In step S914, the subgraph counter η is incremented. In step S916, the subgraph counter η is compared with $$\frac{n}{r}$$

to check if all subgraphs have been generated. If $$\frac{n}{r}$$

is greater than η the method returns to step S906 and the next subgraph is formed. If $$\frac{n}{r}$$

is not greater than η the method ends.

Figure 10:
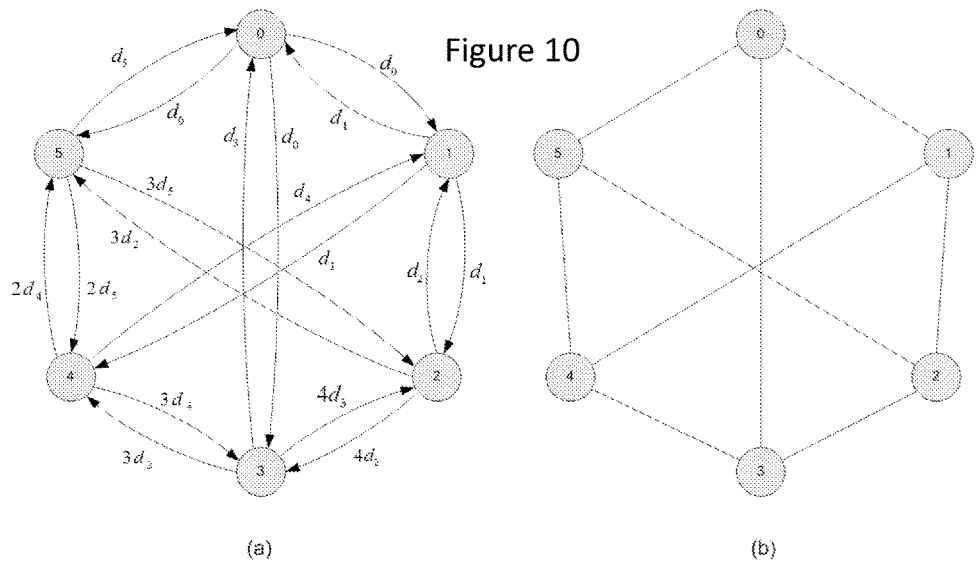

FIG. 10a shows an example of an array code with n=6 nodes capable of correcting r=3 erasures. All the arithmetic is in GF(5).

FIG. 10b shows the connectivity graph for the array code shown in FIG. 10a.

Figure 11:
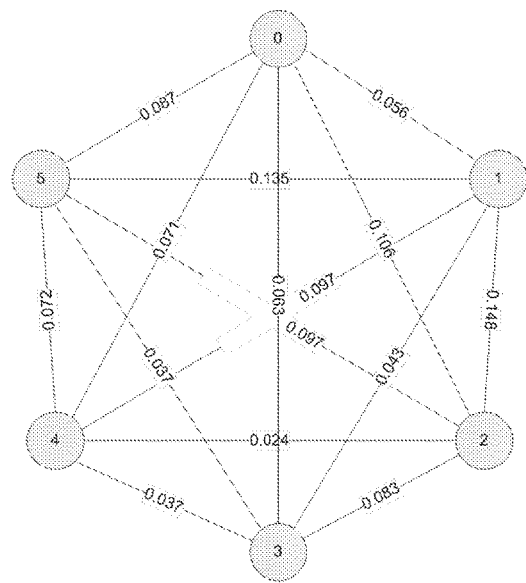
FIG. 11 shows the internode error probabilities for an example network.

FIG. 11 shows the internode error probabilities. As discussed above, it is noted that the internode error probabilities do not have to be symmetric for the method to work.

Using the greedy algorithm in FIG. 9, first nodes {1,2} are selected since $p_{1,2}$ is the largest error probability. Hence $V_1$={1,2} and V={0,3,4,5} after this step. The best of the remaining nodes is then node 4 since arg $max_{i \in V} \Sigma_{j \in V_1} p_{i,j}$=4; consequently $V_1$={1,2,4} and V={0,3,5} after this step. This completes the node set $V_1$ of the subgraph since there are r=3 nodes in that set.

The algorithm then moves on to find the next disjoint subgraph. The largest remaining probability is arg $max_{(i,j) \in V}$ $p_{i,j}$=(0,5), so $V_2$={0,5} and V={3}. The best (and only) remaining node is 3 which completes $V_2$={0,3,5}. All $$\frac{n}{r} = 2$$

subgraphs are now found.

The configuration of the array code (renaming of nodes) is now done by looking at the complement graph.

Figure 12:
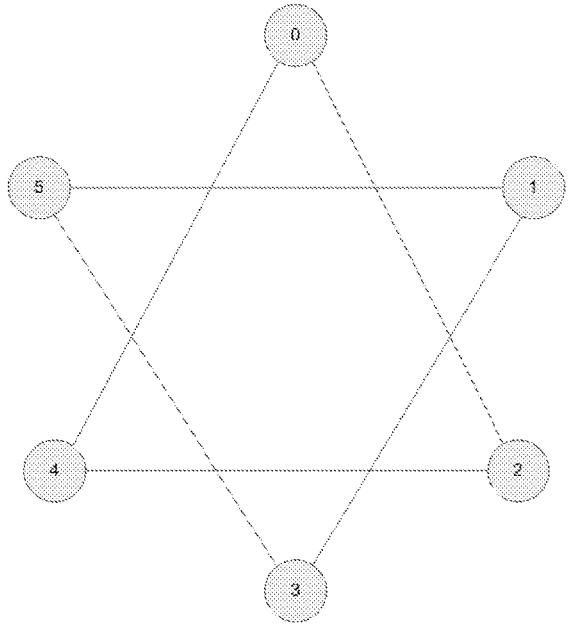
FIG. 12 shows the complement graph of the connectivity graph shown in FIG. 10b.

FIG. 12 shows the complement graph of the connectivity graph shown in FIG. 10b. The three connected nodes {0,2,4} should be mapped to $V_1$={1,2,4} and the other connected nodes {1,3,5} should be mapped to $V_2$={0,3,5}. Note that this mapping is not unique.

Figure 13:
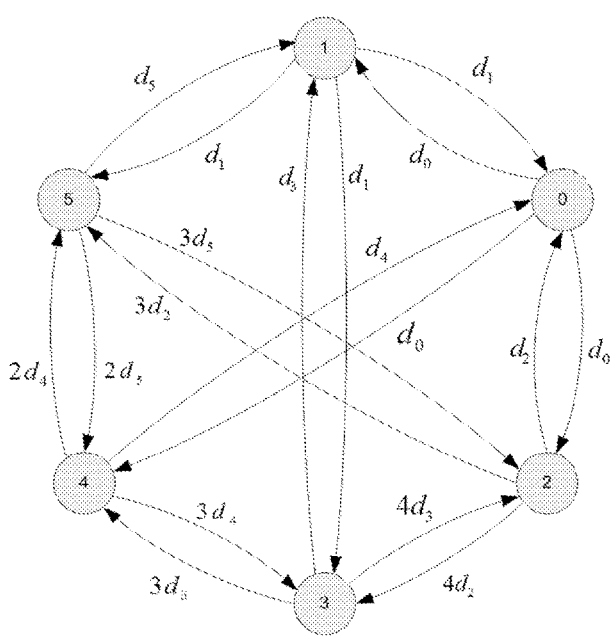
FIG. 13 shows an array code reconfigured according to an embodiment.

FIG. 13 shows the reconfigured array code. There are 10 isomorphic graphs to the one in FIG. 10b, so an exhaustive search would check all of them and pick the best one. In this example, it turned out that the greedy algorithm in FIG. 9 finds the best one but that is not guaranteed.

Figure 14:
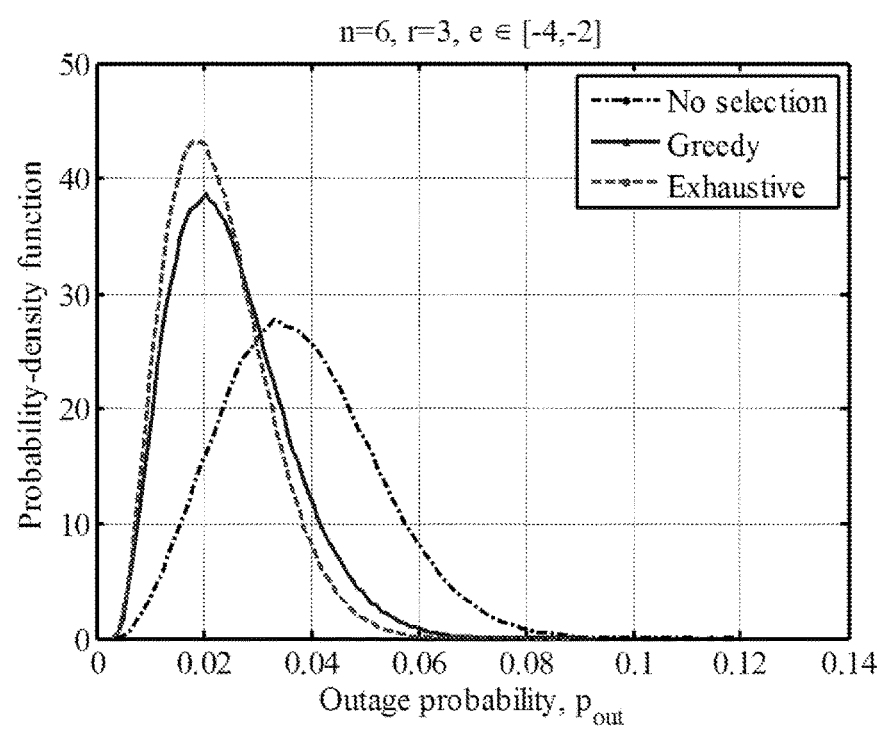
FIG. 14 shows an evaluation of the performance embodiments.

FIG. 14 shows an evaluation of the performance of the greedy algorithm described above. To evaluate the average performance of the greedy algorithm, the internode error probabilities are modelled as $10^e$ where e is a random variable uniformly distributed in the interval [−4, −2]. The outage probability is then also a random variable and its probability density function (PDF) is shown. As can be seen, the greedy algorithm performs much better than no configuration and almost as well as the optimal one (exhaustive search).

Embodiments described herein provide a way of configuring an array code to reduce the outage probability. If the internode error probabilities are known, e.g., by using long-term measurements, they are used to configure the array code. Since a given array code can be configured in many equivalent ways by simply renaming the nodes, the internode error probabilities can be exploited to reduce the outage probability.

While certain embodiments have been described, these embodiments have been presented by way of example only, and are not intended to limit the scope of the inventions. Indeed, the novel methods, systems, devices and networks described herein may be embodied in a variety of other forms; furthermore, various omissions, substitutions and changes may be made without departing from the spirit of the inventions. The accompanying claims and their equivalents are intended to cover such forms or modifications as would fall within the scope and spirit of the inventions.

The invention claimed is:

1. A method of communicating data symbols in a wireless network, the wireless network comprising a concentrator node, a first data generating node, and a plurality of other data generating nodes, the method comprising:
    receiving, at the first data generating node, data symbols from the other data generating nodes;
    receiving, at the first data generating node, an indication of an arrangement of an array code from the concentrator node;
    receiving, at the first data generating node, a request from the concentrator node for data symbols from the wireless network; and
    transmitting, by the first data generating node to the concentrator node, a data symbol generated by the first data generating node and the parity symbol,
    wherein the array code comprises a plurality of entries, and
    wherein each entry indicates the dependence of a parity symbol generated by a node on the data symbols received from other nodes, and the arrangement of the array code indicates which entry corresponds to which data generating node of the wireless network, the arrangement of the array code being determined by:
        receiving, at the concentrator node, a plurality of link-quality indications, wherein each link-quality indication represents the quality of the wireless communication link between two nodes of the plurality of data generating nodes; and
        assigning an entry of the array code to each data generating node in a manner that minimizes an outage probability of the wireless network, wherein the outage probability represents the probability that parity symbols cannot be formed by the plurality of data generating nodes and is based on the plurality of link-quality indications received by the concentrator node.

2. A method according to claim 1, further comprising sending an indication of the arrangement to the data generating nodes by sending to each data generating node an indication of the dependence of the parity symbols stored on that data generating node on the data symbols stored on other data generating nodes.

3. A method according to claim 1, further comprising sending an indication of the arrangement to the data generating nodes by sending to each data generating node an indication of data generating nodes of the wireless network to which to send the data symbols stored on that node.

4. A method according to claim 1 wherein the indications of link-quality are internode error probabilities.

5. A method according to claim 4, further comprising identifying a pair of nodes having the highest internode error probability and selecting an arrangement in which no data symbols are exchanged between the identified pair of nodes.

6. A method according to claim 5, further comprising iteratively grouping nodes having the highest internode probability together to form a set of subgraphs and determining the arrangement for the array code from a complement graph of the set of subgraphs.

7. A method according to claim 4, further comprising determining an outage probability for each of the plurality of possible arrangements and selecting the possible arrangement having the lowest outage probability.

8. A method according to claim 1 wherein the arrangement of the array code from is selected from a plurality of stored possible arrangements.

9. A method according to claim 1, further comprising selecting an arrangement of the array code from a plurality of possible arrangements using the indications of link-quality by determining an array code from the number of data generating nodes in the network and an indication of the required redundancy of the array code, and determining the plurality of possible arrangements from the array code.

10. A controller for a wireless network, the wireless network comprising a plurality of data generating nodes, each data generating node configured to generate and store data symbols and parity symbols, the parity symbols depending on data symbols stored on other data generating nodes, the controller comprising:
   a wireless interface configured to receive indications of link quality estimates for wireless links between the data generating nodes; and
   a processor configured to select an arrangement for an array code from a plurality of possible arrangements, wherein the array code comprises a plurality of entries, wherein each entry indicates the dependence of the parity symbols generated by a node on the data symbols received from other data generating nodes, and the arrangement of the array code indicates which entry corresponds to which data generating node of the wireless network, the arrangement of the array code being determined by:
      assigning an entry of the array code to each data generating node in a manner that minimizes an outage probability of the wireless network, wherein the outage probability represents the probability that parity symbols cannot be formed by the plurality of data generating nodes and is based on the plurality of link quality estimates received by the controller, and
   wherein the wireless interface is further configured to send an indication of the selected arrangement to the data generating nodes.

11. A controller according to claim 10, further comprising storage for the plurality of possible arrangements.

12. A controller according to claim 11, wherein the storage is configured to store a plurality of array codes and the processor is further configured to select an array code from the plurality of array codes.

13. A controller according to claim 10, wherein the wireless interface is further configured to send each data generating node an indication of the dependence according to the configured array code of the parity symbols stored on that data generating node on the data symbols stored on other data generating nodes.

14. A controller according to claim 10, wherein the wireless interface is further configured to send to each data generating node an indication of data generating nodes of the wireless network to which to send the data stored on that node.

15. A controller according to claim 10, wherein the indications of link quality estimates are internode error probabilities.

16. A controller according to claim 15 wherein the processor is further configured to identify a pair of nodes having the highest internode error probability and select an arrangement in which there is no dependence of parity symbols on data symbols between the identified pair of nodes.

17. A controller according to claim 16 wherein the processor is further configured to iteratively group nodes having the highest internode probability together to form a set of subgraphs and to determine the arrangement for the array code from a complement graph of the set of subgraphs.

18. A controller according to claim 15 wherein the processor is further configured to determine an outage probability for each of the plurality of possible arrangements and selecting the possible arrangement having the lowest outage probability.

19. A non-transitory computer readable carrier medium carrying processor executable instructions which when executed on a processor cause the processor to carry out a method according to claim 1.

* * * * *